United States Patent Office 3,217,134
Patented Nov. 9, 1965

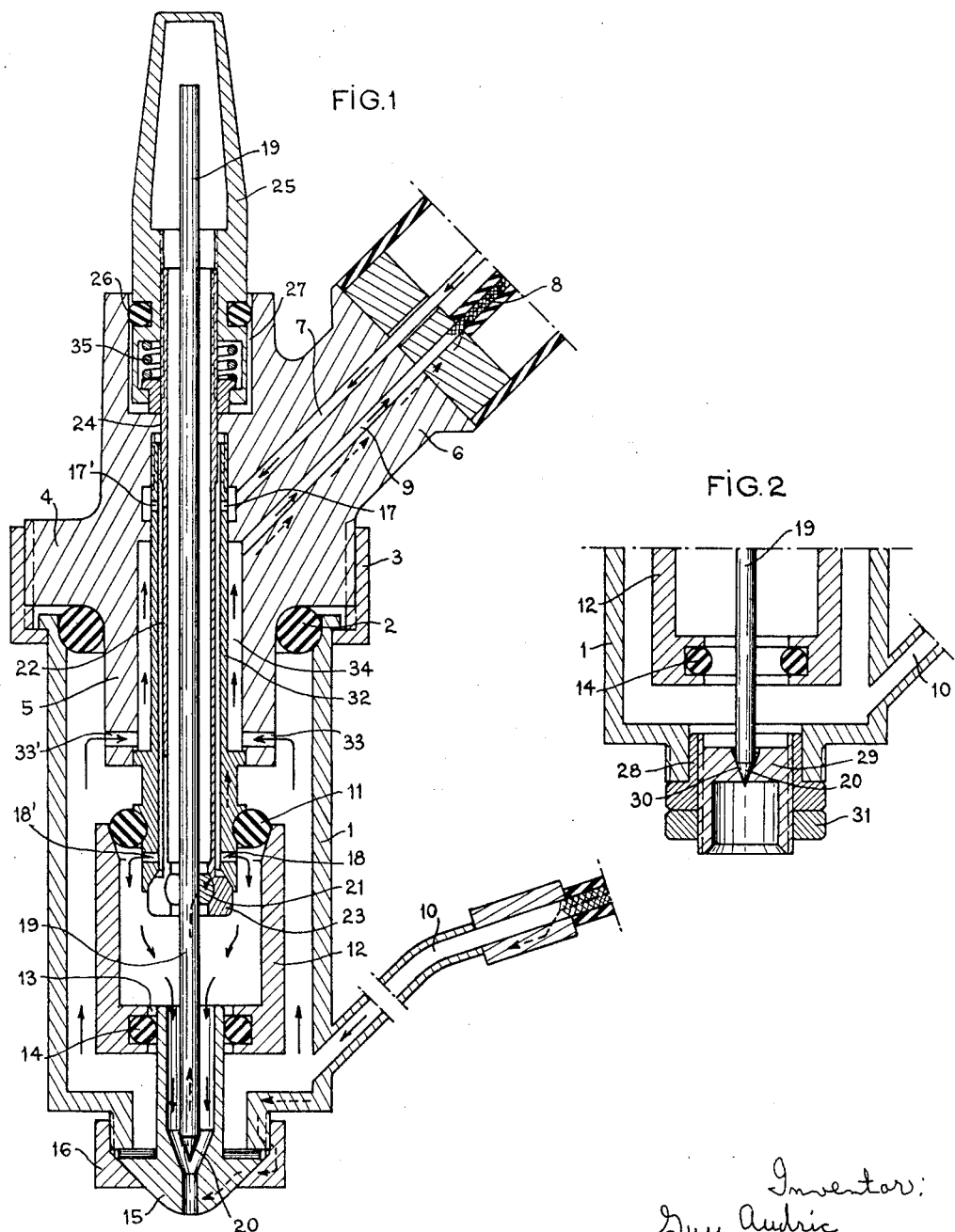

3,217,134
MEANS FOR CENTERING THE ELECTRODE IN PLASMA TORCHES
Guy Audric, Paris, France, assignor to l'Air Liquide, Societe Anonyme pour l'Etude et l'Exploitation des Procedes Georges Claude
Filed June 17, 1963, Ser. No. 288,334
Claims priority, application France, July 13, 1962, 903,950, Patent 1,340,849
8 Claims. (Cl. 219—75)

The present invention relates to torches known as plasma torches or restricted arc torches and intended particularly for cutting metals or the formation of coatings by projections of metals or refractory substances. It is known that these apparatus are formed by a member in which is disposed an electrode rod, while the member terminates in a nozzle which is coaxial with this electrode and through which escapes a jet of ionised gas brought to very high temperature (plasma) by the electric arc, the gas used being blown into the torch member around the central electrode and the arc being established either between the central electrode and the nozzle ("blown" arc), or between the electrode and the element to be worked, which must be conductive and connected to the circuit of the electric arc (known as "transferred" arc).

It is known that in order to obtain very concentrated arcs which permit of the ionised gas jet being brought to very high temperature (for example, in the region of 10,000° C.), it is necessary to use nozzles having very small flow passages in the plasma torches, and the consequence of this is that it is necessary to have very accurate centering of the electrode in relation to the nozzle. The present invention is concerned more particularly with a centering means for the electrode, and is characterized in that it comprises an element in the form of a ball which is slotted and perforated along one diameter, into which ball the electrode is introduced, a support in the form of a clamp constituted by a slotted tube having at its end a spherical seating for the said ball, a locking sleeve concentric with the said tubular clamp and an electrode positioning and centering gauge which is screwed temporarily on to the torch member in place of the nozzle and which has on its internal face a conical recess into which is brought the conical end of the electrode before tightening the clamp.

By way of example, one embodiment of the means according to the invention is hereinafter described and illustrated in the accompanying drawing.

FIGURE 1 shows diagrammatically an axial section of the torch assembly.

FIGURE 2 is an axial section of the lower part of the torch, into which is inserted the setting gauge.

As shown in FIGURE 1, the plasma torch which, in the example illustrated, is a blown arc torch of a type known per se, is composed of a member 1 connected at its upper end by means of a sealing ring 2 and a threaded ring 3 to a head 4 which is formed with a tubular mouthpiece 5 and a lateral part 6 containing the gas inlet 7, the electric cable 8 adapted to be connected to the electrode and a discharge pipe 9 for the cooling water which enters the lower part of the member 1 through the duct 10. Screwed inside the tubular mouthpiece 5 is a sleeve 32, which is connected by a fluid-tight joint 11 to an element in the form of a cylindrical cup 12, the bottom of which has an opening 13 containing a sealing ring 14 into which is inserted the tubular body of the nozzle 15, which is locked on the threaded end of the member 1 by a locking nut 16.

The gas entering by way of the passage 7 enters the sleeve 32 through the upper orifices 17, 17' and leaves the said sleeve through the cup 12 by way of the lower orifices 18, 18', while the cooling water entering the member 1 through the pipe 10 passes through the orifices 33, 33' of the mouthpiece 5 into the annular space 34 contained between this mouthpiece and the sleeve 32 in order to be discharged therefrom through the duct 9.

Disposed axially of the sleeve 32 is the rod electrode 19 having a conical point 20, which is held according to the invention by the following elements which form part of the positioning and centering means: a steel ball 21 is drilled along one diameter in order to allow the electrode 19 to pass therethrough and it is slotted in order that it may be locked resiliently on the said electrode. A clamp formed by a slotted tube 22 has an enlarged lower end 23 which is positioned beneath the end of the sleeve 32 and in which is formed a spherical seating for the ball 21. The tubular clamp 22 is threaded at its end in order to receive a hollow threaded cap 25 which is inserted by means of a sealing ring 26 into a central recess 27 which is coaxial with the opening 24 of the head 4. The locking of the clamp 22 and the ball 21 on the electrode 19 is effected in known manner by tightening the cap 25 and placing the clamp 22 under traction, the enlarged head of which becomes blocked in the lower flared end of the sleeve 32. A spring 35 is arranged in the cap 25 to compensate for the expansions.

In order to center and accurately position longitudinally the end 20 of the electrode 19, the nozzle 15 is removed and it is replaced (FIGURE 2) by a centering gauge formed by an internally threaded bushing 28, in which can be screwed to a greater or lesser extent a core 29 having on its internal face a conical recess 30, the shape of which corresponds to that of the point 20 of the electrode 19. The position of the core 29 in the bushing 28 is set by a locking nut 31.

With the clamp 22 slackened and the cap 25 removed, the electrode 19 is passed through the ball 21 until its point is just positioned in the cone 30 of the gauge, the core 29 of which has been placed at a suitable height by screwing into the bushing 28. The clamp 22 is then locked by tightening the cap 25, the centering gauge 28–29 is removed and the nozzle 15 again placed in position.

It is obvious that the details of the constructional form of the arrangement which have just been described can be modified without departing from the scope of the invention: for example, it is possible, instead of locking the tubular clamp by placing it under traction in a fixed locking sleeve, it is possible to provide a fixed clamp and a locking sleeve which slides on this clamp under the action of the cap, or in any other manner.

I claim:
1. In a plasma torch having a body formed with a nozzle mounting aperture for a removable nozzle and a mounting means for an electrode comprising ball means to engage and clamp said electrode, a tubular support member for said ball means extending longitudinally of said body and coaxial with said nozzle mounting aperture, said tubular support member having one end formed with means to support said ball means and said electrode in a position coaxially of said nozzle mounting aperture in said body, locking means on said tubular support member to secure said ball means and said electrode in position in said body; an electrode centering device comprising a centering member having an inner portion adapted to be positioned in said body in said nozzle mounting aperture and having means on said inner portion to engage, center and position one end of said electrode with respect to said nozzle mounting aperture.

2. The device as described in claim 1 in which the end of said electrode adjacent said nozzle mounting aperture in said body is conical, and said inner portion of said centering member is formed with a conical recess to engage and center said end of said electrode.

3. The device as described in claim 1 in which the electrode, when in its centered position, is only in contact with said ball means.

4. A plasma torch having a body formed with a nozzle mounting aperture for a removable nozzle and a mounting means for an electrode comprising ball means to engage and clamp said electrode, a tubular support member for said ball means extending longitudinally of said body and coaxial with said nozzle mounting aperture, said tubular support member having one end formed with means to support said ball means and said electrode in a position coaxially of said body, and an electrode centering device comprising a centering member having an inner portion adapted to be positioned in said nozzle mounting aperture of said body and having means on said inner portion to engage, center and position one end of said electrode with respect to said nozzle mounting aperture, and locking means on said tubular support member to secure said ball means and said electrode in position in said body when said centering means positions said electrode.

5. The device as described in claim 1 in which said electrode centering device has means to adjust the axial position of said centering member to accurately gauge the axial position of the tip of said electrode with respect to said nozzle mounting aperture in said body.

6. A centering device for an electrode mounted in a plasma torch having a body formed with a nozzle opening and a mounting for said electrode having a conical end, said device comprising an element in the form of a ball which is slotted and perforated along one diameter and into which said electrode is introduced, a support in the form of a clamp constituted by a slotted tube having at its end a spherical seat, said ball being mounted in the said seat, a locking sleeve concentric with said tubular clamp, and a positioning and centering gauge mounted in the nozzle opening, said gauge having a bushing with an internal conical recess for receiving the conical end of the electrode.

7. A centering device as set forth in claim 6, characterized in that the electrode, when it is in a middle position, is only in contact with the said ball.

8. A centering device for an electrode mounted in a plasma torch having a body formed with a nozzle opening and a mounting for said electrode, said device comprising an element in the form of a ball which is slotted and perforated along one diameter and into which said electrode is introduced, a support in the form of a clamp constituted by a slotted tube having at its end a spherical seat, said ball being mounted in the said seat, a locking sleeve concentric with said tubular clamp, and a flanged and internally threaded sleeve mounted in the nozzle, an externally threaded bushing threaded into said sleeve and having an internal conical recess and a locking nut threaded on the bushing, whereby the axial position of the bushing and its conical seat may be adjustable in the sleeve to accurately gauge the position of the tip of the electrode.

References Cited by the Examiner

UNITED STATES PATENTS

| | | | |
|---|---|---|---|
| 837,690 | 12/06 | Labunski | 33—189 |
| 2,427,290 | 9/47 | Licwinko | 33—191 X |
| 2,480,399 | 8/49 | Dolaser | 33—91 |
| 3,069,532 | 12/62 | Hill et al. | 219—75 X |

FOREIGN PATENTS 972,225   10/64   Great Britain.

JOSEPH M. WOOD, *Primary Examiner.*
JOSEPH V. TRUHE, *Examiner.*